UNITED STATES PATENT OFFICE.

JOSHUA HUDSON WILLIAMS, OF GREENVILLE, SOUTH CAROLINA.

FOOD PRODUCT AND PROCESS OF MANUFACTURING SAME.

1,194,456.     Specification of Letters Patent.     Patented Aug. 15, 1916.

No Drawing. Original application filed March 15, 1916, Serial No. 84,361. Divided and this application filed May 15, 1916. Serial No. 97,557.

*To all whom it may concern:*

Be it known that I, JOSHUA HUDSON WILLIAMS, a citizen of the United States, residing at Greenville, in the county of Greenville and State of South Carolina, have invented a new and useful Food Product and Process of Manufacturing Same, of which the following is a specification.

This application is a division of my co-pending application Serial No. 84,361.

My invention relates to a novel food the principal ingredients of which are sweet potatoes or yams in combination with a suitable flour of different substance. It is my object to produce a novel food product of these ingredients and to provide a novel process for manufacturing the food, as hereinafter set forth.

In producing the food, I take sweet potatoes or yams and cook them thoroughly. The sweet potatoes or yams are then peeled and placed in a mechanical mixer such as is used in a bakery to mix dough. The mass is mixed thoroughly and I gradually add enough flour to make into a dough. I also add salt, sugar and other flavoring ingredients at will. I also add yeast. The resultant mass is mixed into a dough and allowed to rise as many times as is necessary. It is then made into loaves and baked and allowed to cool. It is then sliced and put in an oven and thoroughly toasted. It is then put into a mill and ground into nutlike particles, in which condition it is ready to be marketed.

The flour which I employ is of some suitable substance other than sweet potatoes, such as wheat, barley, corn or rye flour. Sufficient flour is employed to give the desired consistency, the percentage of flour required ordinarily varying from 35 per cent. to 55 per cent., depending on the condition of the sweet potatoes or yams; the amount of fiber and moisture contained in different varieties varying, and also varying in the same variety at different seasons of the year.

It is also within the contemplation of my invention to omit sweetening and produce a food containing the natural flavor.

What I claim is:

1. A food product of nut-like particles produced from a baked dough of sweet potatoes and flour of a different substance.

2. A baked and toasted nut-like food produced from a cooked dough of sweet potatoes, a flour of different substance, and flavoring ingredients.

3. The process of manufacturing a food from sweet potatoes, consisting in cooking the potatoes; peeling and mixing the potatoes to a dough; adding flour, flavoring ingredients and yeast; baking; slicing; toasting; grinding into nut-like particles.

4. The process of manufacturing a food from sweet potatoes, consisting in cooking the potatoes; peeling; mixing the peeled potatoes to a dough; adding flour to thicken; adding flavoring ingredients and yeast; mixing; baking; cooling; slicing; toasting; grinding into nut-like particles.

5. The process of manufacturing a nut-like food, consisting in cooking sweet potatoes; peeling; mixing the potatoes to a dough; adding from 35 to 55 per cent. flour to give the required consistency; adding flavoring ingredients and yeast; mixing to a dough; allowing to rise as many times as necessary; making into loaves; baking; allowing to cool; slicing; toasting; grinding into nut-like particles in a mill.

J. HUDSON WILLIAMS.

Witnesses:
    CECILE CLARKE,
    W. W. AMICK.